(12) United States Patent
Klassen

(10) Patent No.: US 6,567,565 B1
(45) Date of Patent: May 20, 2003

(54) ANTIALIASED IMAGE RENDERING ALGORITHM

(75) Inventor: R. Victor Klassen, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/358,774

(22) Filed: Jul. 22, 1999

(51) Int. Cl.[7] ............................. G06K 9/40; G06K 9/32
(52) U.S. Cl. ..................................... 382/274; 382/298
(58) Field of Search ................................ 382/265, 266, 382/264, 263, 274, 275, 269; 358/451

(56) References Cited

U.S. PATENT DOCUMENTS

| | | | |
|---|---|---|---|
| 5,717,781 A | * | 2/1998 | Ebel .......................... 382/141 |
| 6,415,053 B1 | * | 7/2002 | Norimatsu ................. 382/199 |
| 6,466,700 B1 | * | 10/2002 | Makram-Ebeid ............ 382/265 |

* cited by examiner

Primary Examiner—Jerome Grant, II
(74) Attorney, Agent, or Firm—Fay, Sharpe, Fagan, Minnich & McKee, LLP

(57) ABSTRACT

A method of processing a pixel of interest within an image receives colors defining a plurality of pixels within a neighborhood of pixels including the pixel of interest and a plurality of respective surrounding pixels. A determination is made as to whether a border exists between first and second regions within the neighborhood of pixels. If the border exists, it is determined if the border exists within the pixel of interest. If the border exists within the pixel of interest, a first color is identified on a first side of the border and a second color is identified on a second side of the border. If the border exists within the pixel of interest, respective amounts of coverage are identified for the first and second colors within a scaled up pixel corresponding to the pixel of interest. The scaled up pixel is printed.

20 Claims, 5 Drawing Sheets

1. dY = UR - UL + LR - LL ;
2. dX = LL - UL + LR - UR ;
3. if ( dX > 0 )
    4. if ( dY > 0 )
        5. sum = dX + dY ;
    6. else
        7. sum = dX - dY ;
8. else
    9. if ( dY > 0 )
        10. sum = - dX + dY ;
    11. else
        12. sum = - dX - dY ;
        if sum > ( 0.25 X ( MAX (UR, UC, UR, ML, POI, MR, LL,
            LC, LR ) - MIN ( UR, UC, UR, ML, POI, MR, LL, LC, LR ) )
13. dX = dX * 255 / sum;
14. dY = dY * 255 / sum;
15. key = ( ( ( dX >> 7 ) & 0 x 3 ) << 2) I ( ( dY >> 7) & 0 X 3 ) ;

FIG.7A 16. switch ( key )
    17. case 0, 3, 12, 15;
        18. DOHARD = FALSE
        19. RETURN;
    20. case 1, 13;
        21. c1 = left; c3 = right; Break;
    22. case 2, 14;
        23. c3 = left; c1 = right; Break;
    24. case 4, 7;
        25. c1 = up; c3 = down; Break;
    26. case 8, 11;
        27. c1 = down; c3 = LR; Break;
    28. case 5;
        29. c1 = UL; c3 = LR; Break;
    30. case 10;
        31. c1 = LR; c3 = UL; Break;
    32. case 6;
        33. c1 = UR; c3 = LL; Break;
    34. case 9;
        35. c1 = LL; c3 = UR; Break;

FIG.7B

36. c2 = mid;
37. d1 = c2 - c1;
38. d2 = c3 - c2;
39. DOHARD = ( ( ( d1 ^ d2 ) > = 0 ) and ( c1 ! = c3 ) );
40. if ( DOHARD)
    41. coverage = d1 / ( d1 + d2 );
42. BUFFER = Lookup ( dX, dY, coverage );
43. Index = 0;
44. for ( i = 0; i < Y; ++ i )
    45. for ( j = 0; j < X; j ++ )
        46. * out [ i ] ++ = c1 + ( ( c3 - c1 ) * BUFFER [ Index ++ ] >> 7 );

ANTIALIASED IMAGE RENDERING ALGORITHM

BACKGROUND OF THE INVENTION

The present invention relates to scaling (i.e., enlarging or reducing) color images. It finds particular application in conjunction with scaling antialiased original color images to prepare them for display on hard-copy or soft-copy and will be described with particular reference thereto. It will be appreciated, however, that the invention is also amenable to other like applications.

The use of graphics in computer and communication applications is very widespread and is becoming increasingly prevalent. A computing device often transmits a document including graphical data to a printing device using a page description language. Page description languages (e.g., the PostScript® language) include interpretive programming commands useful for implementing powerful graphics capabilities. When transmitted via a page description language, graphical data is typically converted into a raster image file. Printing devices then include electronics and software for making marks on paper corresponding to positions in the raster image file where the image values so indicate.

Page description language interpreters may include means for printing antialiased images. In the context of gray-scale raster data, antialiasing refers to introducing intermediate intensity levels along edges of the object for smoothing jagged lines in lower resolution images. Similarly, in the context of color raster data, antialiasing refers to introducing intermediate colors along the edges of objects to achieve the same effect in lower resolution color images.

In general, the cost of computing power necessary for manipulating data is at least proportional to the amount of data to be manipulated. Therefore, it is often cheaper to manipulate data for lower resolution images. When it becomes desirable to print the image stored using low-resolution data, the data must then be scaled up to a higher resolution. In this manner, a high-resolution image is produced using less computing power than would otherwise be required. Similarly, the image is transmitted using substantially less transmission bandwidth. For example, an image to be printed at 1000 square inches per minute, 600×4800 spots per inch, and 1 bit per pixel, if transmitted at full resolution, requires 48M bits per second raw bandwidth. On the other hand under the same circumstances, if the image is computed at 400 spots per inch, antialiased to 8 bits per pixel, and transmitted before scaling, the total required bandwidth is only 21M bits per second.

Scaling up a pixel of an image included within an area having a single, constant color is relatively simple. More specifically, each pixel within the area of constant color is replaced by a group of pixels having the same color.

Scaling up pixels along edges or other geometries, on the other hand, is relatively more complicated. FIG. 1 illustrates a portion of an antialiased image 10 having dark lines 12 that are approximately 2.5 pixels thick. The lines 12 in FIG. 1 are scaled up for improved visibility and are best viewed at approximately five (5) feet for receiving a correct subjective impression. FIG. 2 illustrates a magnified view 14 of the top, left portion of FIG. 1. The edge position 16 of FIG. 2 is represented by pixels having intermediate gray-levels. When the intermediate gray-levels are halftoned, as shown in FIG. 3, the resulting appearance 20 depends strongly on where the dot center is relative to the pixel. If the image is halftoned using a typical high-addressability scheme, in which each contone input pixel is replaced with a set of binary output pixels, some of the generated halftone dots 22 are disconnected from the line 24 (see FIG. 3). Several conventional algorithms (e.g., hyperacuity and tagged antialiased imaging) exist for scaling up pixels to be halftoned.

Hyperacuity seeks to improve image quality without increasing overall resolution. Information concerning the location of where edges are to be printed is maintained with a high degree of accuracy, but without increasing the resolution of the input data. A byte-map, instead of a bit-map, is used for the desired image of text (or lineart) to be printed. Each bit position is replaced with a multi-bit byte of coded information, such as a gray value or pixel. The information contained in these multi-bit gray pixels is processed with neighboring gray pixels within the hyperacuity printer to generate an identification of where the edges should be placed. This information, in turn, is used to adjust the exposure in the printer in an optimal manner in order to produce edges that do not have a stair stepping effect. Hyperacuity printing requires a preprocessing stage for deciding when to simply halftone the image and when to treat it as line art and interpolate an edge position.

Tagged antialiased imaging involves thresholding input data into various categories of brightness. Template matching is used to determine whether the thresholded data "looks" like an antialiased edge. The template matching approach tags pixels along the edge to indicate whether the edge is dark on the left, the right, or top/bottom. The halftone screen is changed in accordance with which of the four (4) cases occurs (i.e., left, right, top/bottom, or none). In the left and right cases, a high-frequency screen having darkness and lightness growing from one side of the screen is used. In the top/bottom case, the screen grows from the center.

Tagged antialiased imaging is based on an assumption that edges worth rendering as antialiased are only identified by intermediate color-levels. Furthermore, neither of the methods discussed above is capable of determining whether an edge exists or an orientation of an edge when the edge divides two regions of color that are not full (or nearly) on and off. Therefore, this information must be supplied to the hyperacuity and tagged antialiased rendering algorithms.

One approach used for generating tags for hyperacuity and tagged antialiased rendering is to threshold the data so that pixels with one neighbor with more than one threshold and one with less than another threshold must be present. Having a threshold at which the rendering technique changes invariably leads to the possibility of artifacts. First, consider a 95% black line on a sweep from white to 50% gray. At some point in the sweep, the contrast drops to a point that the rendering technique changes, leading to an artifact at this point. Second, consider a pictorial image. Only very high contrast edges in such an image will retain an acceptable appearance if rendered as lineart, or tagged to use the high frequency halftone. If the threshold is too low, far too many pixels within an image fit the criterion and, therefore, use the high-frequency halftone. Even synthetic data may not switch smoothly between the methods. A line at certain angles may have pixels that appear to meet the criterion, whereas elsewhere on the same line there are pixels that do not. FIG. 3 illustrates that a variety of gray-levels result in such situations.

As illustrated in FIG. 4, a partial dotting 26 preserves an edge 28 when a "clean" edge is between first and second gray-levels 30, 32, respectively. Despite the fact that the edge 28 is not between black and white, it is preserved as well as can be achieved without changing the intensity along the edge 28. This results as a natural result of halftoning an edge between two gray levels if the edge is at the same resolution as the halftone dot.

Another conventional method for transforming a pixel from low-resolution to high-resolution looks at a window around the pixel. Patterns are identified within the pixels in the window. The patterns are compared to known samples at both 300 spots per inch ("spi") and 600 spi. There are several drawbacks with this method. For example, the original image may contain patterns that are not recognized. Furthermore, the patterns viewed at 300 spi may equally translate to two (2) different objects at 600 spi. Also, in order to be able to accurately identify patterns, the number of pixels within the window may need to be relatively large (e.g., a 5×5 window), which requires more memory. Furthermore, a relatively large look-up table, having significantly more gates, is required to store the different patterns. Another disadvantage of such a method as commonly practiced is that it involves the use of thresholding and, therefore, is not capable of handling edges between any two (2) gray-levels.

The present invention provides a new and improved apparatus and method which overcomes the above-referenced problems and others.

SUMMARY OF THE INVENTION

An apparatus for scaling up an input image includes a memory for storing original pixels. A processor, which communicates with the memory, receives respective intensities of at least one neighborhood of the original pixels including a pixel of interest and a plurality of respective surrounding pixels. The processor identifies the pixels within the neighborhood including an edge between a first region and a second region and produces a scaled up pixel of interest as a function of the intensities of the pixels within the neighborhood and first and second gradients of the intensities. An output device, which communicates with the processor, displays the scaled up pixel of interest.

In accordance with one aspect of the invention, the original pixels include low-resolution and antialiased pixels.

In accordance with another aspect of the invention, if a sum of an absolute value of the first and second gradients is greater than a predetermined number, the processor normalizes the first and second gradients within a range determined as a function of the intensities.

In accordance with a more limited aspect of the invention, the processor determines the predetermined number as about one-fourth of a difference between a maximum intensity and a minimum intensity.

In accordance with another aspect of the invention, the processor determines a key value as a function of the first and second gradients. The processor determines first and second scaled up intensities as a function of the key value.

In accordance with a more limited aspect of the invention, the processor determines a coverage portion for at least one of the first and second scaled up intensities within the scaled up pixel of interest as a function of the first and second scaled up intensities and the intensity of the pixel of interest.

In accordance with a more limited aspect of the invention, the first and second scaled up intensities are assigned to a plurality of subpixels, which define the scaled up pixel of interest, according to a pattern determined as a function of the key value and the coverage portion.

In accordance with an even more limited aspect of the invention, the neighborhood includes nine pixels.

In accordance with another aspect of the invention, the output device includes a printing device.

One advantage of the present invention is that it is simpler to implement than previous methods for scaling up pixels.

Another advantage of the present invention is that it does not utilize thresholding for scaling up a pixel of interest and, therefore, may scale up a pixel having an edge between any two (2) gray-levels.

Another advantage of the present invention is that it requires a smaller look-up table than conventional scaling up methods.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 7A, 7B, and 7C illustrate a process for scaling up the neighborhood of pixels illustrated in FIG. 6; and FIG. 8 illustrates a scaled up version of the pixel of interest.

DETAILED DESCRIPTION OF THE PREFERRED EMBODIMENTS

Figure 1:
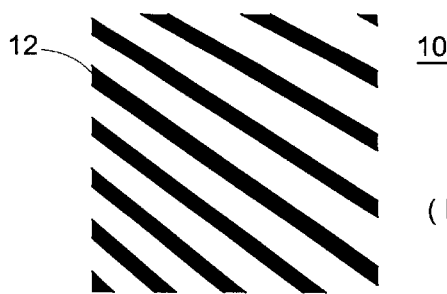
FIG. 1 illustrates a prior art antialiased image having dark lines that are approximately 2.5 pixels thick.
Figure 2:
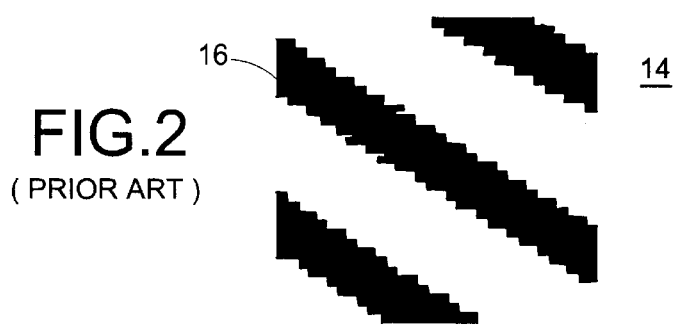
FIG. 2 illustrates a magnified view of the top, left portion of the prior art image shown in FIG. 1.
Figure 3:
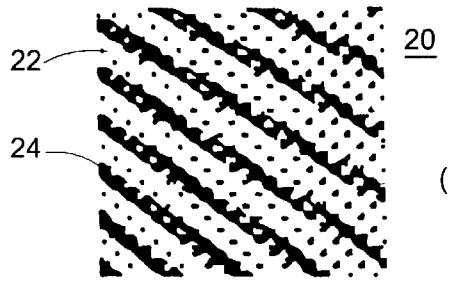
FIG. 3 illustrates the effect of conventional halftoning for the image shown in FIG. 1.
Figure 4:
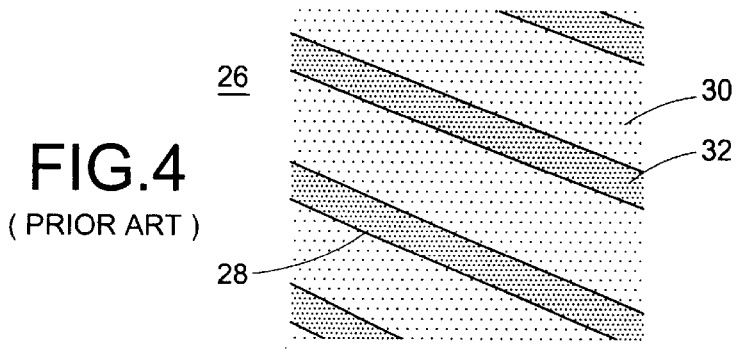
FIG. 4 illustrates the effect of conventional partial dotting when clean edges exist between two (2) gray levels.
Figure 5:
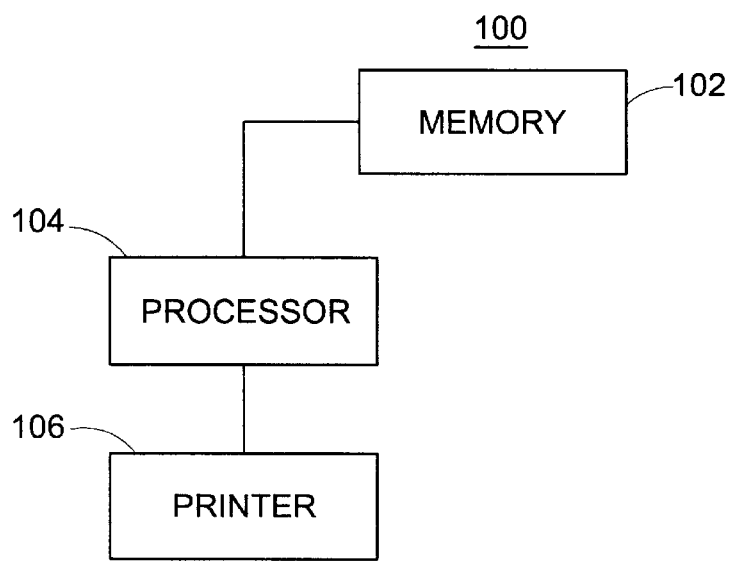
FIG. 5 illustrates a system according to the present invention.

FIG. 5 illustrates a system 100 for scaling up low-resolution data (e.g., pixels) from an original image, which has been antialiased. The low-resolution data for the antialiased image is stored in a memory 102. The memory 102 communicates with a processor 104, which in turn communicates with a high-addressability output device 106. In the preferred embodiment, the output device 106 is a color printer. However, it is also contemplated that the output device 106 be other devices (e.g., a gray-scale printer or a facsimile machine capable of producing either color or gray-scale output). The processor 104 receives the antialiased data from the memory 102, scales up the antialiased data, and transmits the high-resolution data to the high-addressability output device 106.

Figure 6:
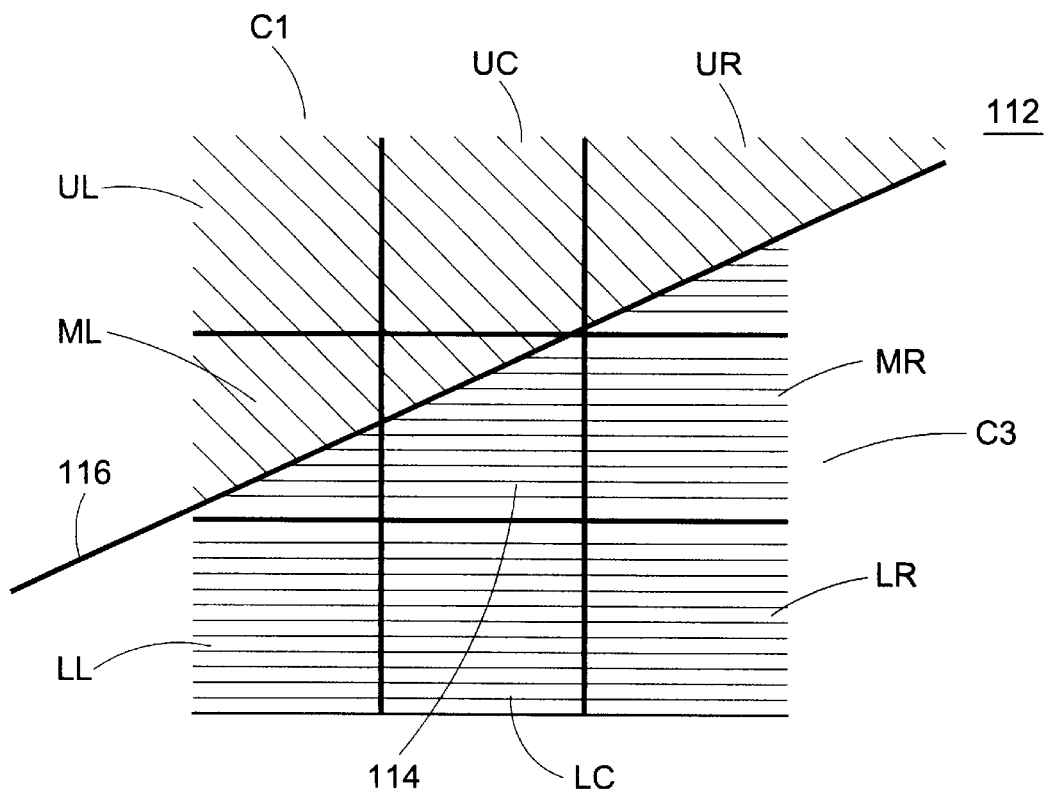
FIG. 6 illustrates a neighborhood of pixels.

The process of scaling up the data transforms a single pixel of the low-resolution, antialiased data into a group of high-resolution pixels. FIG. 6 illustrates a 3×3 neighborhood 112, including a low-resolution, antialiased pixel of interest ("POI") 114, which is stored in the memory. The 3×3 neighborhood 112 includes an upper-left pixel UL, an upper-center pixel UC, an upper-right pixel UR, a middle-left pixel ML, a middle-right pixel MR, a lower-left pixel LL, a lower-center pixel LC, a lower-right pixel LR, and the POI 114. An edge 116, which is defined between a first color $c1$ and a second color c3, passes through the 3×3 neighborhood 112. FIG. 7 illustrates the steps used for scaling up the antialiased POI 114.

Numerical values are assigned to the POI 114 and eight (8) surrounding pixels UL, UC, UR, ML, MR, LL, LC, LR. More specifically, a pixel completely covered by the first color c1 is assigned a value of 128 while a pixel completely covered by the second color c3 is assigned a value of 255. Pixels through which the edge 116 passes, and which are partially covered by both the first and second colors c1, c3, are assigned values based on the respective proportion of coverage of the first and second colors c1, c3. In the example shown in FIG. 6, UL=128, UC=128, UR=160, ML=160, MR=255, LL=255, LC=255, LR=255, and the POI 114=223.

With reference to FIGS. 6 and 7A–7C, steps 1 and 2 of the process compute local gradients along an x-direction and a y-direction of the 3×3 neighborhood 112. More specifically, a gradient along the y-direction dY is calculated in step 1 as UR−UL+LR−LL=32. Similarly, a gradient along the x-direction dX is calculated in step 2 as LL−UL+LR−UR= 222.

Steps 3–12 determine a sum of the absolute values of dX and dY. If the sum calculated in steps 3–12 is very small (e.g., less than or equal to about 25% of the range of pixel values), the edge is not well enough defined to normalize the values of dX and dY. Therefore, in steps 13 and 14 of the preferred embodiment, if the sum of the absolute values of dX and dY is greater than about one-quarter (¼) of the range between the minimum and maximum pixel values, the values of dX and dY are normalized within a range including zero (0) and 255.

In the example described above, the minimum and maximum pixel values are 128 and 255, respectively. Therefore, one-quarter (¼) of the range between the minimum and maximum pixel values is 0.25*(255−128), or about 32. The sum of the absolute values of dX and dY is 254 (i.e., 222+32). Since the sum of the absolute values of dX and dY is greater than about one-quarter (¼) of the range between the minimum and maximum pixel values, the values of dX and dY are normalized within a range including zero (0) and 255 in steps 13 and 14, respectively. In the example described above, the normalized dX and dY values are 223 and 32, respectively.

In alternate embodiments, it is also contemplated to normalize dX and dY if the sum of the absolute values of dX and dY is greater than some number ranging from about zero (0) to about one-quarter (¼) of the range between the minimum and maximum pixel values.

A four bit key value is determined in step 15 as a function of the values of dX and dY. Because the values of both dX and dY are in the range of −255 to +255, two's complement binary representations of the values of dX and dY require nine (9) bits. The first bit represents the sign of the value and the last eight (8) bits represent the numerical value. As is customary in two's complement notation, a sign bit of zero (0) indicates a positive number and a sign bit of one (1) indicates a negative number. The binary representations of dX and dY for the example shown in FIG. 6 are 011011111 and 000100000, respectively.

The expressions "dX>>7 & 0x3" and "dY>>7 & 0x3" included in step 15 indicate to shift the nine (9) bit values of dX and dY, respectively, seven (7) bits to the right. In this manner, the lower-seven (7) bits of dX and dY are eliminated and only the two (2) most significant bits of dX and dY (i.e., 00 and 00, respectively) remain. The expression "<<2" indicates to shift the value of dX into the two (2) most significant bits of the key value. The two (2) bits of dY are inserted into the least two (2) significant bits of the key value using a logical "OR" operation. In other words, the two (2) most significant bits of dX represent the two (2) most significant bits of the key number, while the two (2) most significant bits of dY represent the two (2) least significant bits of the key number. Therefore, for the example shown in FIG. 6, the key value is 0100.

Because the key number is four (4) bits, its value ranges from zero (0) to 15. The key value indicates the locations and orientations of the two (2) colors in the 3×3 neighborhood 112. The orientations specify whether the edge between the two (2) colors is horizontal, diagonal, or vertical. The locations of the two (2) colors specify which part of the 3×3 neighborhood 112 includes the first color c1, which is considered the "light" color, and which part includes the second color c3, which is considered the "dark" color.

Step 17 represents the case where the key number equals 0, 3, 12, or 15. In binary representation, the key number equals 0000, 0011, 1100, or 1111, respectively. In this situation, the two (2) highest order bits of dX are equal and the two highest order bits of dY are equal, which indicates that the values are close to zero (0). If the high order bits of both dX and dY are close to zero (0), the difference between the values at the two (2) top corners and two (2) bottom corners and the difference between the two (2) left corners and two (2) right corners of the 3×3 neighborhood 112 are close to zero (0). Consequently, it is assumed that there is no edge within the 3×3 neighborhood 112. When there is no edge in the 3×3 neighborhood 112, it is not appropriate to use the scaling up method of the present invention. Therefore, a Boolean variable, DOHARD, is set false for flagging the processor to use an alternate algorithm for scaling up the POI 114. For example, alternate algorithms are contemplated for scaling up the POI 114 as a function of the nearest neighbors or linear interpolation, etc. After it is determined to use an alternate scaling up algorithm, control is passed to a subroutine for executing that scaling algorithm.

Steps 20–35 select two (2) pixel values within the 3×3 neighborhood 112, which represent the first and second colors c1, c3, respectively, as a function of the key number.

Step 20 represents a case where the key number equals one (1) or 13 (i.e., 0001 or 1101, respectively, in binary). In this case, the two (2) bits of dX are equal and the two (2) bits of dY are "01". Such a key value is produced when a vertical edge passes through the 3×3 neighborhood 112 and the lighter color is on the left side of the edge while the darker color is on the right side of the edge. In step 21, the color on the left side of the edge (e.g., the color value of the pixel ML) is assigned to c1 and the color on the right side of the edge (e.g., the color value of the pixel MR) is assigned to c3.

Step 22 represents a case where the key number equals two (2) or 14 (i.e., 0010 or 1110, respectively, in binary). In this case, the two (2) bits of dX are equal and the two (2) bits of dY are "10". Such a key value is produced when a vertical edge passes through the 3×3 neighborhood 112 and the darker color is on the left side of the edge while the lighter color is on the right side of the edge. In step 23, the color on the right side of the edge (e.g., the color value of the pixel MR) is assigned to c1 and the color on the left side of the edge (e.g., the color value of the pixel ML) is assigned to c3.

Step 24 represents a case where the key number equals four (4) or seven (7) (i.e., 0100 or 0111, respectively, in binary). In this case, the two (2) bits of dX are "01" and the two (2) bits of dY are equal. Such a key value is produced when a horizontal edge passes through the 3×3 neighborhood 112 and the lighter color is above the edge while the darker color is below the edge. In step 25, the color above the edge (e.g., the color value of the pixel UC) is assigned to c1 and the color below the edge (e.g., the color value of the pixel LC) is assigned to c3.

Step 26 represents a case where the key number equals eight (8) or 11 (i.e., 1000 or 1011, respectively, in binary). In this case, the two (2) bits of dX are "10" and the two (2) bits of dY are equal. Such a key value is produced when a horizontal edge passes through the 3×3 neighborhood 112 and the darker color is above the edge while the lighter color is below the edge. In step 27, the color below the edge (e.g., the color value of the pixel LC) is assigned to c1 and the color above the edge (e.g., the color value of the pixel UC) is assigned to c3.

Step 28 represents a case where the key number equals five (5) (i.e., 0101 in binary). In this case, the two (2) bits of dX and the two (2) bits of dY are "01". Such a key value is produced when a diagonal edge passes through the 3×3 neighborhood 112 from the bottom left to the top right corners. Furthermore the lighter color is above the diagonal edge while the darker color is below the diagonal edge. In step 29, the color above the diagonal edge (e.g., the color value of the pixel UL) is assigned to c1 and the color below the diagonal edge (e.g., the color value of the pixel LR) is assigned to c3.

Step 30 represents a case where the key number equals 10 (i.e., 1010 in binary). Such a key value is produced when a diagonal edge passes through the 3×3 neighborhood 112 from the bottom left to the top right corners. Furthermore the lighter color is below the diagonal edge while the darker color is above the diagonal edge. In step 31, the color below the diagonal edge (e.g., the color value of the pixel LR) is assigned to c1 and the color above the diagonal edge (e.g., the color value of the pixel UL) is assigned to c3.

Step 32 represents a case where the key number equals six (6) (i.e., 0110 in binary). Such a key value is produced when a diagonal edge passes through the 3×3 neighborhood 112 from the bottom right to the top left corners. Furthermore the lighter color is above the diagonal edge while the darker color is below the diagonal edge. In step 33, the color above the diagonal edge (e.g., the color value of the pixel UR) is assigned to c1 and the color below the diagonal edge (e.g., the color value of the pixel LL) is assigned to c3.

Step 34 represents a case where the key number equals nine (9) (i.e., 1001 in binary). Such a key value is produced when a diagonal edge passes through the 3×3 neighborhood 112 from the bottom right to the top left corners. Furthermore the lighter color is below the diagonal edge while the darker color is above the diagonal edge. In step 35, the color below the diagonal edge (i.e., the color value of the pixel LL) is assigned to c1 and the color above the diagonal edge (i.e., the color value of the pixel UR) is assigned to c3.

In the example shown in FIG. 6, the key number equals 0100. Therefore, step 25 assigns 128 to c1 and 255 to c3.

In step 36, a numerical value, which represents a value of the POI 114 (e.g., 223 in the example described above), is assigned to a variable c2. Variables d1 and d2 are calculated in steps 37 and 38, respectively. The value of d1 is the difference between the values of c2 and c1. The value of d2 is the difference between the values of c3 and c2. In the example shown in FIG. 6, d1 equals 95 and d2 equals 32.

The Boolean variable DOHARD is determined in step 39. The variable DOHARD is calculated as a function of whether the exclusive-or of the binary expressions of d1 and d2 is greater than or equal to zero (0) and whether the value of c1 does not equal the value of c3. This is equivalent to checking that either c1>c2>c3 or c1<c2<c3. In the example described above, DOHARD equals TRUE.

Because DOHARD is TRUE, a proportion of c3 in the 3×3 neighborhood 112 is calculated in step 41 as d1÷(d1+d2) (e.g., 0.75 in the above example). A proportion of c1 in the neighborhood 112 is d2÷(d1+d2) (e.g., 0.25 in the above example).

Because the key value in the illustrated example is 0100, the POI 114 will be scaled up into a group of pixels having a horizontal edge. The darker color c3 comprises about 75% of the scaled up group of pixels below the horizontal edge while the lighter color c1 comprises about 25% of the scaled up group of pixels above the horizontal edge.

With reference again to FIG. 5, a normalization look-up table, which is stored in the memory, is preferably indexed with six (6) bits for each dX and dY. In this manner, the look-up table includes four (4) bit normalized values for each dX and dY. Consequently, the look-up table stores about 4096 bytes of information (one for each value of the combination of dX and dY).

If the steps 20–35 indicate that an edge exists, control is transferred to step 42 for scaling up the POI 114. In step 42, a value of a variable BUFFER is retrieved from a scaling look-up table as a function of the values of dX, dY, and COVERAGE. The variable BUFFER includes a matrix of values for defining a block of Y scanlines of X scaled up pixels, for representing the scaled up POI 114. The process of assigning colors to the block of X by Y pixels is set forth in the steps 43–46, which implement nested loops for assigning colors within a range from c1 to c3 to each of the scaled up pixels. The variable BUFFER is effectively a three dimensional lookup table that provides patterns indicating which subpixels are on which side of an edge between an object covering COVERAGE of a pixel and the background. The parametric equation of the edge is given by $(X, Y)=(X_0, Y_0)+t*(dX, dY)$, for some point $(X_0, Y_0)$. The value of COVERAGE, along with dX and dY, completely determines $X_0$ and $Y_0$.

In the preferred embodiment, the matrix of BUFFER values only includes ones and zeros. For example, if it is determined that a horizontal edge passes through the POI 114, the matrix of BUFFER values assigns the scaled up pixels above the edge a value of one (1) and the scaled up pixels below the edge a value of zero (0). Then, in step 46, the value within the BUFFER matrix corresponding to the scaled up pixel within the POI 114 is multiplied by {c1+ ((c3−c1)*BUFFER[Index]}, where Index is a counter variable. If, as in the preferred embodiment, the values within the BUFFER matrix only include ones and zeros, the scaled up pixels will only be assigned the values of c1 or c3. In this case, logical operations may replace the multiplications.

FIG. 8 illustrates a scaled up pixel of interest 120. In the preferred embodiment, the POI is scaled up four (4) times in the horizontal direction and four (4) times in the vertical direction. In this manner, the scaled up pixel 120 includes sixteen subpixels 122. The top four (4) subpixels 122 are assigned the value of c1 (i.e., 128) while the bottom twelve subpixels 122 are assigned the value of c3 (i.e., 255). Although the preferred embodiment discloses a scaled up pixel having sixteen subpixels, it is to be understood that other embodiments, having different numbers of subpixels, are also contemplated.

In an alternate embodiment, the BUFFER matrix includes zeros, ones, and fractional values between zero (0) and one (1). Therefore, the scaled up pixels are assigned values in the range of c1 to c3.

The scale factors in X and in Y determine the size of the look-up table. Specifically, the size of the look-up table is $X*Y*2^{2o+c}$ where o and c are the number of bits of orientation and coverage, respectively. In an alternate embodiment, the orientation is derived from dX and dY. In that embodiment, it is also contemplated to use a look-up table for determining the orientation).

If three (3) bits are used for both the orientation and coverage, for printing 600 dpi by 4,800 dpi from a 300 dpi by 300 dpi input, the values of X and Y are 16 and 2, respectively. Therefore, the total table size is $16*2*2^{2(3)3+3}=$ about 16 kilobytes. It is contemplated that the multiplication be performed as an eight (8) bit number (for c3−c1) times a four (4) bit number (for BUFFER[index]), thereby reducing the shift to three (3) bits. In this case, the multiplication is optionally done using a table look-up of 4 kilobytes.

It is to be understood that after the scaling up process is completed, the POI is halftoned before it is printed using the output device, unless the output device accepts continuous tone data, such as is the case for many soft-copy devices.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The preferred embodiment having been thus described, the invention is now claimed to be:

1. An apparatus for scaling up an input image, comprising:
    a memory for storing original pixels;
    a processor, communicating with the memory, for receiving respective intensities of at least one neighborhood of the original pixels including a pixel of interest and a plurality of respective surrounding pixels, the processor identifying the pixels within the neighborhood including an edge between a first region and a second region and producing a scaled up pixel of interest as a function of the intensities of the pixels within the neighborhood and first and second gradients of the intensities; and
    an output device, communicating with the processor, for displaying the scaled up pixel of interest.

2. The apparatus for scaling up an input image as set forth in claim 1, wherein the original pixels include low-resolution and antialiased pixels.

3. The apparatus for scaling up an input image as set forth in claim 1, wherein if a sum of an absolute value of the first and second gradients is greater than a predetermined number, the processor normalizes the first and second gradients within a range determined as a function of the intensities.

4. The apparatus for scaling up an input image as set forth in claim 3, wherein the processor determines the predetermined number as about one-fourth of a difference between a maximum intensity and a minimum intensity.

5. The apparatus for scaling up an input image as set forth in claim 3, wherein:
    the processor determines a key value as a function of the first and second gradients; and
    the processor determines first and second scaled up intensities as a function of the key value.

6. The apparatus for scaling up an input image as set forth in claim 5, wherein the processor determines a coverage portion for at least one of the first and second scaled up intensities within the scaled up pixel of interest as a function of the first and second scaled up intensities and the intensity of the pixel of interest.

7. The apparatus for scaling up an input image as set forth in claim 6, wherein the first and second scaled up intensities are assigned to a plurality of subpixels, defining the scaled up pixel of interest, according to a pattern determined as a function of said key value and said coverage portion.

8. The apparatus for scaling up an input image as set forth in claim 7, wherein the neighborhood includes nine pixels.

9. The apparatus for scaling up an input image as set forth in claim 1, wherein the output device includes a printing device.

10. A method for scaling up low-resolution pixels within an image, comprising:
    receiving respective intensities for at least one neighborhood of original low-resolution pixels, including a pixel of interest and a plurality of respective surrounding pixels, from a memory into a processor;
    identifying the pixels within the neighborhood including an edge between a first region and a second region;
    producing a scaled up pixel of interest as a function of the intensities of the pixels within the neighborhood and first and second gradients of the intensities; and
    outputting the scaled up pixel of interest on a tangible medium.

11. The method for scaling up low-resolution pixels within an image as set forth in claim 10, further including:
    if a sum of an absolute value of the first and second gradients is greater than a predetermined number, normalizing the first and second gradients within a predetermined range.

12. The method for scaling up low-resolution pixels within an image as set forth in claim 11, further including:
    determining a key value as a function of the first and second gradients; and
    determining first and second scaled up intensities as a function of the key value.

13. The method for scaling up low-resolution pixels within an image as set forth in claim 12, further including:
    determining a coverage portion for at least one of the first and second scaled up intensities within the scaled up pixel of interest as a function of the first and second scaled up intensities and the intensity of the pixel of interest.

14. The method for scaling up low-resolution pixels within an image as set forth in claim 13, further including:
    assigning the first and second scaled up intensities to a plurality of subpixels, defining the scaled up pixel of interest, according to a pattern determined as a function of said key value and said coverage portion.

15. The method for scaling up low-resolution pixels within an image as set forth in claim 14, wherein the original low-resolution pixels include antialiased pixels, the method further including:
    determining the first gradient as a function of a change in an intensity in a first direction within the neighborhood; and
    determining the second gradient as a function of a change in an intensity in a second direction within the neighborhood.

16. A method of processing a pixel of interest within an image, comprising:
    receiving colors defining a plurality of pixels within a neighborhood of pixels including the pixel of interest and a plurality of respective surrounding pixels;
    determining if a border exists between first and second regions within the neighborhood of pixels;

if the border exists, determining if the border exists within the pixel of interest;

if the border exists within the pixel of interest, identifying a first color on a first side of the border and a second color on a second side of the border;

if the border exists within the pixel of interest, identifying respective amounts of coverage for the first and second colors within a scaled up pixel corresponding to the pixel of interest; and displaying the scaled up pixel.

17. The method of processing a pixel of interest within an image as set forth in claim 16, wherein the step of determining if a border exists within the neighborhood of pixels includes:

determining first and second color gradients, in respective first and second directions within the neighborhood of pixels, as a function of colors in corner pixels of the neighborhood; and determining if a border exists within the neighborhood of pixels as a function of the first and second color gradients.

18. The method of processing a pixel of interest within an image as set forth in claim 17, further including:

if a sum of the absolute values of the first and second color gradients is greater than a predetermined number, normalizing the first and second color gradients within a predetermined range.

19. The method of processing a pixel of interest within an image as set forth in claim 18, wherein the step of determining if a border exists within the pixel of interest includes:

determining a key number as a function of the first and second color gradients; and determining if a value of the key number is a predetermined number.

20. The method of processing a pixel of interest within an image as set forth in claim 19, wherein the step of identifying respective amounts of coverage for the first and second colors determines the amounts of coverage as a function of the first and second colors and a color of the pixel of interest.

* * * * *